(12) United States Patent
Wang et al.

(10) Patent No.: US 8,510,095 B2
(45) Date of Patent: Aug. 13, 2013

(54) MOBILE ELECTRONIC DEVICE AND ASSOCIATED METHOD ENABLING TRANSLITERATION OF A TEXT INPUT

(75) Inventors: Xin Wang, Waterloo (CA); Vadim Fux, Waterloo (CA); Michael Elizarov, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

(21) Appl. No.: 13/595,659

(22) Filed: Aug. 27, 2012

(65) Prior Publication Data

US 2012/0323555 A1 Dec. 20, 2012

Related U.S. Application Data

(63) Continuation of application No. 12/463,593, filed on May 11, 2009, now Pat. No. 8,275,601.

(60) Provisional application No. 61/052,222, filed on May 11, 2008.

(51) Int. Cl.
*G06F 17/28* (2006.01)

(52) U.S. Cl.
USPC .................. 704/2; 704/8; 704/5; 704/277

(58) Field of Classification Search
USPC ............... 704/1–10, 251, 255, 257, 277, 272, 704/270, 270.1
See application file for complete search history.

(56) References Cited

U.S. PATENT DOCUMENTS

| | | | |
|---|---|---|---|
| 5,535,119 A | 7/1996 | Ito et al. | |
| 7,136,803 B2* | 11/2006 | Kida et al. | 704/3 |
| 8,200,475 B2* | 6/2012 | Kotipalli | 704/3 |
| 2008/0291171 A1 | 11/2008 | Shin et al. | |

FOREIGN PATENT DOCUMENTS

CN 1379342 A 11/2002

OTHER PUBLICATIONS

Office Action dated Aug. 28, 2012, in corresponding Chinese Patent Application No. 200910163975.5, and translation of Office Action (9 pages).
Office Action dated Oct. 26, 2011, in corresponding Chinese Patent Application No. 200910163975.5, and translation of Office Action (15 pages).
Office Action dated Apr. 3, 2013, in corresponding Chinese Patent Application No. 200910163975.5, and translation of Office Action (12 pages).

* cited by examiner

*Primary Examiner* — Huyen X. Vo
(74) *Attorney, Agent, or Firm* — Finnegan, Henderson, Farabow, Garrett & Dunner, LLP

(57) ABSTRACT

An improved mobile electronic device enables the inputting of text in one alphabet, Traditional Chinese in the present example, by transliteration of inputs in another alphabet, BoPoMoFo in the present example. Since some of the inputs can be ambiguous, transliteration of an ambiguous input is delayed until a detection of a finalization event, thus avoiding the outputting of unnecessary transliteration results, and thus advantageously avoiding a distraction to the user.

18 Claims, 9 Drawing Sheets

US 8,510,095 B2

MOBILE ELECTRONIC DEVICE AND ASSOCIATED METHOD ENABLING TRANSLITERATION OF A TEXT INPUT

CROSS-REFERENCE TO RELATED APPLICATION

The present application is a continuation of U.S. patent application Ser. No. 12/463,593, filed May 11, 2009, which claims priority to U.S. Provisional Application Ser. No. 61/052,222, filed May 11, 2008, both of which are hereby incorporated by reference.

BACKGROUND

1. Field

The disclosed and claimed concept relates generally to mobile electronic devices and, more particularly, to a mobile electronic device and method that enable transliteration of a text input.

2. Background Information

Numerous types of mobile electronic devices are known. Examples of such mobile electronic devices include, for instance, personal data assistants (PDAs), handheld computers, two-way pagers, cellular telephones, and the like. Many mobile electronic devices also feature wireless communication capability, although many such mobile electronic devices are stand-alone devices that are functional without communication with other devices.

In certain circumstances, text in a certain alphabet or language can be phonetically input using a different alphabet, i.e., a different set of characters. By way of example, BoPoMoFo is a means by which Traditional Chinese characters can by input via the inputting of phonetic BoPoMoFo characters. The BoPoMoFo "alphabet" comprises approximately thirty-eight BoPoMoFo characters and five tones, all of which comprise phonetic content which, when input as text, can be transliterated into Traditional Chinese text.

Pinyin Chinese is another type of phonetic text input transliteration system which enables Simplified Chinese, i.e., Standard Mandarin, characters to by input via the inputting of Latin characters. A "pin" is a phonetic sound, oftentimes formed from a plurality of Latin characters, and each pin is associated with one or more Standard Mandarin characters. More than four hundred pins exist, and each pin typically corresponds with a plurality of different Standard Mandarin characters.

While such transliteration algorithms have been generally effective for their intended purpose, such transliteration algorithms have not been without limitation. It thus would be desired to provide an improved method and mobile electronic device that facilitate the inputting of text.

BRIEF DESCRIPTION OF THE DRAWINGS

A full understanding of the disclosed and claimed concept can be gained from the following Description when read in conjunction with the accompanying drawings in which:

Similar numerals refer to similar parts throughout the specification.

DESCRIPTION

Figure 1:
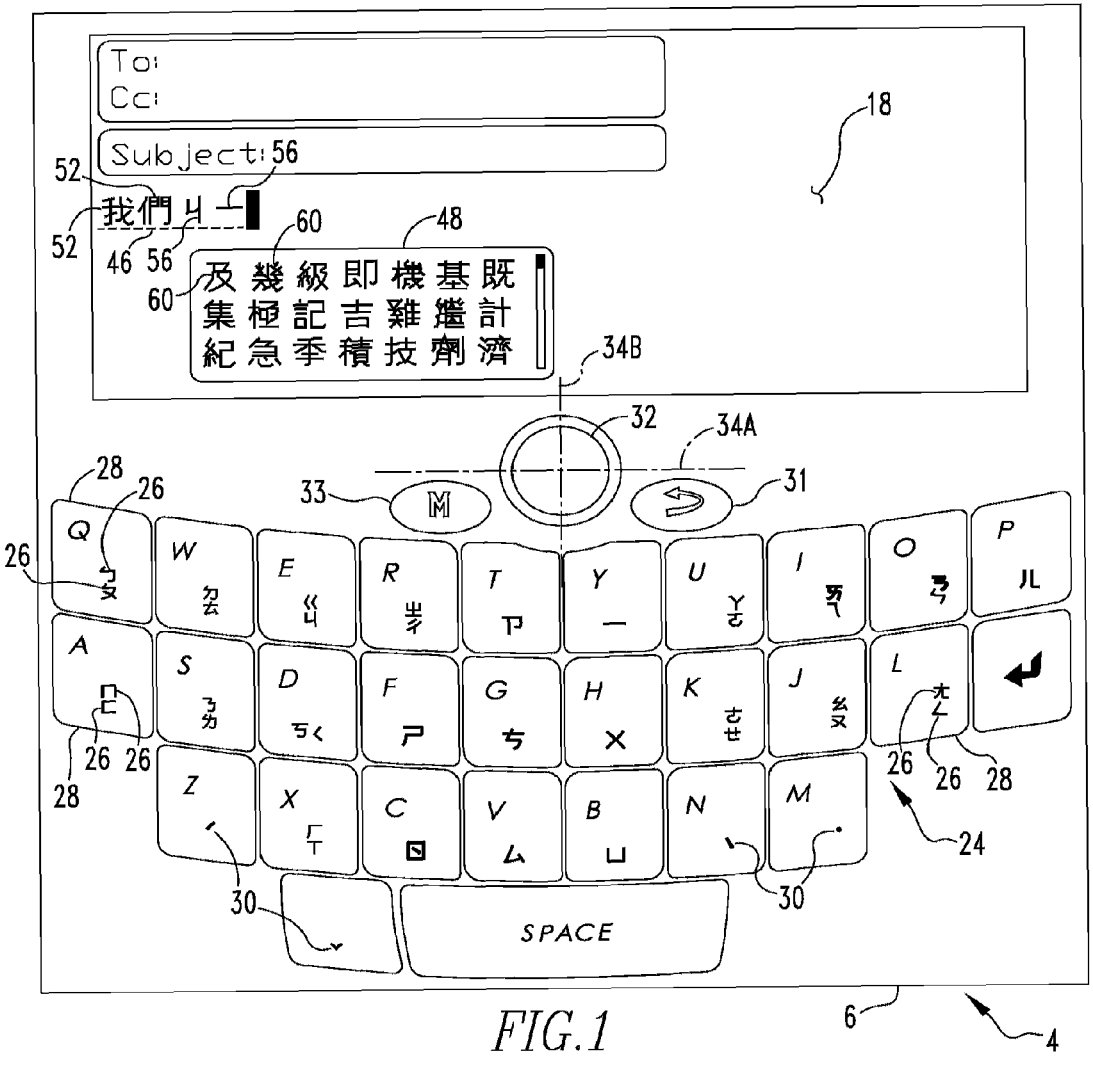
FIG. 1 is a top plan view of an improved mobile electronic device in accordance with the disclosed and claimed concept.
Figure 2:
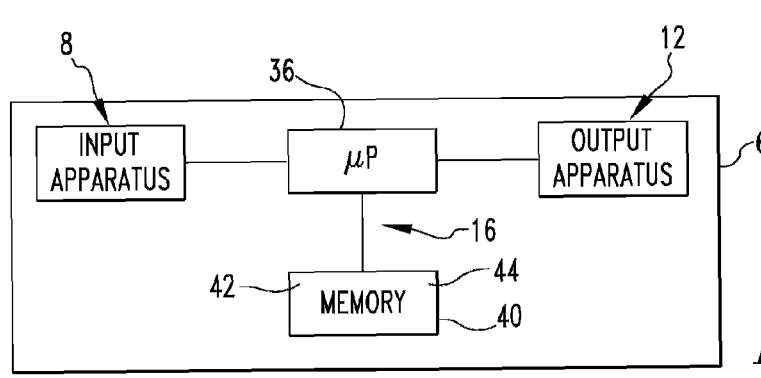
FIG. 2 is a schematic depiction of the improved mobile electronic device of FIG. 1.

An improved mobile electronic device 4 is indicated generally in FIG. 1 and is depicted schematically in FIG. 2. The exemplary mobile electronic device 4 includes a housing 6 upon which are disposed an input apparatus 8, an output apparatus 12, and a processor apparatus 16. The input apparatus 8 is structured to provide input to the processor apparatus 16, and the output apparatus 12 is structured to receive output signals from the processor apparatus 16. The output apparatus 12 comprises a display 18 that is structured to provide visual output, although other output devices such as speakers, LEDs, tactile output devices, and so forth can be additionally or alternatively used. In an example embodiment, the display 18 is a touchscreen display.

Referring to FIG. 2, the processor apparatus 16 comprises a processor 36 and a memory 40. The processor 36 may be, for instance and without limitation, a microprocessor (µP) that is responsive to inputs from the input apparatus 8 and that provides output signals to the output apparatus 12. The processor 36 interfaces with the memory 40.

The memory 40 can be said to constitute a machine-readable medium and can be any one or more of a variety of types of internal and/or external storage media such as, without limitation, RAM, ROM, EPROM(s), EEPROM(s), FLASH, and the like that provide a storage register for data storage such as in the fashion of an internal storage area of a computer, and can be volatile memory or nonvolatile memory. The memory 40 has stored therein a number of routines 44 which are executable on the processor 36. As employed herein, the expression "a number of" and variations thereof shall refer broadly to any non-zero quantity, including a quantity of one. The routines 44 can be in any of a variety of forms such as, without limitation, software, firmware, and the like. As will be explained in greater detail below, the routines 44 include a text transliteration algorithm in the form of a transliteration routine 44, as well as other routines. The exemplary transliteration routine 44 is employable to enable BoPoMoFo text input to be transliterated into Traditional Chinese word output.

The memory 40 also has stored therein a character table 42 which comprises a large quantity of Traditional Chinese characters and the corresponding BoPoMoFo strings which can be transliterated into the Traditional Chinese characters. It is noted that the Chinese language is used as an exemplary language herein, and it is further understood that other languages such as Japanese and Korean, for example, could similarly be phonetically input on the mobile electronic device 4 without departing from the present concept. That is, the mobile electronic device 4 is described herein in an exemplary fashion as being configured for the phonetic inputting of the Chinese language via transliteration between BoPoMoFo characters and Traditional Chinese characters, and it is understood that in other embodiments the mobile electronic device 4 could be configured to input, for instance, Japanese or Korean text or text in another language without departing from the present concept.

As can be understood from FIG. 1, the input apparatus 8 includes a keyboard 24 and a multiple-axis input device which, in the exemplary embodiment depicted herein, is a trackball 32 that will be described in greater detail below. The keyboard 24 comprises a plurality of keys 28, with many of the keys 28 each having at least one BoPoMoFo character 26 or a tone 30 assigned thereto, and with at least some of the keys 28 each having a plurality of BoPoMoFo characters 26 assigned thereto. The keys 28 and the trackball 32 all serve as input elements that are actuatable to provide input to the processor apparatus 16. The keyboard 24 and the trackball 32 are advantageously disposed adjacent one another on a front face of the housing 6. This facilitates the operation of the trackball 32 without requiring the user's hands to move away from the keyboard 24 during a text entry operation or other operation.

One of the keys 28 is an <ESCAPE> key 31 which, when actuated, provides to the processor apparatus 16 an input that undoes the action which resulted from the immediately preceding input and/or moves the user to a logically higher position within a logical menu tree managed by a graphical user interface (GUI) routine 44. The function provided by the <ESCAPE> key 31 can be used at generally any logical location within any portion of the logical menu tree. The <ESCAPE> key 31 is advantageously disposed adjacent the trackball 32 thereby enabling, for example, an unintended or incorrect input from the trackball 32 to be quickly undone, i.e., reversed, by an actuation of the adjacent <ESCAPE> key 31.

Figure 10:
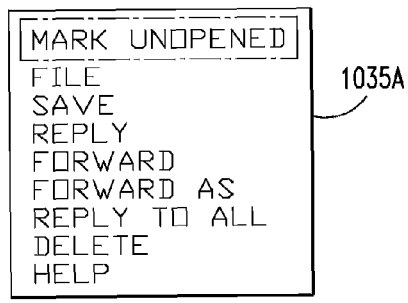
FIG. 10 depicts an exemplary menu that can be output on the mobile electronic device of FIG. 1.

Another of the keys 28 is a <MENU> key 33 which, when actuated, provides to the processor apparatus 16 an input that causes the GUI 44 to generate and output on the display 18 a menu such as is depicted in FIG. 10. Such a menu is appropriate to the user's current logical location within the logical menu tree, as will be described in greater detail below. It is noted that menus and other subject matter that is not directly related to the transliteration algorithm 44 is depicted in an exemplary fashion herein in the English language, although this is not intended to be limiting.

While in the depicted exemplary embodiment the multiple-axis input device is the trackball 32, it is noted that multiple-axis input devices other than the trackball 32 can be employed without departing from the present concept. For instance, other appropriate multiple-axis input devices could include mechanical devices such as joysticks and the like and/or non-mechanical devices such as touch pads, track pads and the like and/or other devices which detect motion or input in other fashions, such as through the use of optical sensors or piezoelectric crystals.

The trackball 32 is freely rotatable in all directions with respect to the housing 6. A rotation of the trackball 32 a predetermined rotational distance with respect to the housing 6 provides an input to the processor apparatus 16, and such inputs can be employed by the routines 44, for example, as navigational inputs, scrolling inputs, selection inputs, and other inputs.

For instance, and as can be seen in FIG. 1, the trackball 32 is rotatable about a horizontal axis 34A to provide vertical scrolling, navigational, selection, or other inputs. Similarly, the trackball 32 is rotatable about a vertical axis 34B to provide horizontal scrolling, navigational, selection, or other inputs. Since the trackball 32 is freely rotatable with respect to the housing 6, the trackball 32 is additionally rotatable about any other axis (not expressly depicted herein) that lies within the plane of the page of FIG. 1 or that extends out of the plane of the page of FIG. 1.

The trackball 32 can be said to be a multiple-axis input device because it provides scrolling, navigational, selection, and other inputs in a plurality of directions or with respect to a plurality of axes, such as providing inputs in both the vertical and the horizontal directions. It is reiterated that the trackball 32 is merely one of many multiple-axis input devices that could be employed on the mobile electronic device 4. As such, mechanical alternatives to the trackball 32, such as a joystick, might have a limited rotation with respect to the housing 6, and non-mechanical alternatives might be immovable with respect to the housing 6, yet all are capable of providing input in a plurality of directions and/or along a plurality of axes.

The trackball 32 additionally is translatable toward the housing 6, i.e., into the plane of the page of FIG. 1, to provide additional inputs. The trackball 32 could be translated in such a fashion by, for example, a user applying an actuating force to the trackball 32 in a direction toward the housing 6, such as by pressing on the trackball 32. The inputs that are provided to the processor apparatus 16 as a result of a translation of the trackball 32 in the indicated fashion can be employed by the routines 44, for example, as selection inputs, delimiter inputs, or other inputs.

The GUI 44 advantageously provides as an output a text input component 46 and a lookup component 48. The text input component 46 typically includes a string of language objects, i.e., BoPoMoFo characters 56 in the exemplary embodiment herein, that correspond with the input from the keyboard 24, or it can include a character interpretation of at least a portion of the input string, such as in the exemplary form of a number of Traditional Chinese characters 52 that have resulted from transliteration of some of the BoPoMoFo characters, or it can include both. That is, in certain circumstances portions of the series of BoPoMoFo characters 56, i.e., inputs, that have been output on the display 18 are replaced at the text input component 46 with Chinese words comprising one or more Traditional Chinese characters 52.

The lookup component 48 is in the nature of a lookup window that is output on the display 18 at a location that typically is different than that of the text input component 46. The text lookup component 48 includes and displays a number of transliterated characters which, in the present example, are Traditional Chinese characters 60. As a general matter, the Traditional Chinese characters 60 in the lookup component 48 will each be a transliteration of at least a portion of the BoPoMoFo characters 56 in the text input component 46. The specific nature of the Traditional Chinese characters 60 in the lookup component 48 varies with the BoPoMoFo content of the text input component 46.

For example, FIG. 1 depicts two BoPoMoFo characters 56 in the text input component 46, and these follow two Traditional Chinese characters 52 in the text input component 46. The two Traditional Chinese characters 52 have been transliterated from and have replaced earlier BoPoMoFo inputs in the series of BoPoMoFo inputs that is being depicted in FIG. 1. The two unconverted BoPoMoFo characters 56 in FIG. 1 can be validly transliterated into any of a plurality of Traditional Chinese characters, i.e., the Traditional Chinese characters 60 that are output in the lookup component 48.

As is generally understood, a Traditional Chinese character can be transliterated from at most a string of three BoPoMoFo characters, i.e., a string of BoPoMoFo characters up to three BoPoMoFo characters in length, plus an optional tone, although the same string of BoPoMoFo characters can also be transliterated into a number of other single Traditional Chinese characters.

As mentioned above, the string of two BoPoMoFo characters 56 in FIG. 1 can be transliterated into any one of the Traditional Chinese characters 60 in the lookup component 48 of the same figure. The situation in FIG. 1 is that the user has entered a series of BoPoMoFo characters, and whereas some of the BoPoMoFo characters at the beginning of the series have already been transliterated into and replaced with the two Traditional Chinese characters 52 in the text input component 46, the two most recently input BoPoMoFo characters 56 have not yet been replaced in the text input component 46 with a transliteration thereof. It is noted, however, that the aforementioned two BoPoMoFo characters 56 have, in fact, been transliterated, and the various alternative transliterations are the Traditional Chinese characters 60 in the lookup component 48. In the example of FIG. 1, the two BoPoMoFo characters 56 can be validly transliterated into any one of the Traditional Chinese characters 60 in the lookup component 48, meaning that each of the Traditional Chinese characters 60 in the lookup component 48 corresponds in the character table 42 with the two BoPoMoFo characters 56. In other situations, it may be the case that the two BoPoMoFo characters in the text input component 46 do not directly correspond with any Traditional Chinese characters, but would validly constitute the first two BoPoMoFo characters of a Traditional Chinese character that comprises three BoPoMoFo characters. In such a situation, the identified Traditional Chinese characters would be output in the lookup component 48 as predictions of the Traditional Chinese characters that the user may be intending to type with the addition of one more BoPoMoFo input. In this situation, the user could select one of the Traditional Chinese character predictions in the lookup component 48, with the result that the selected Traditional Chinese character 60 would be output in the text input component 46 in place of the BoPoMoFo characters 56 that are currently being output there. In other situations, however, the user may simply continue to input BoPoMoFo characters with the result that the BoPoMoFo input will ultimately be transliterated and replaced in the text input component 46 with Traditional Chinese characters from the character table 42.

As such, while the lookup component 48 is provided in certain circumstances to enable a user to select a particular Traditional Chinese character that may be desired, whether a direct transliteration or a predictive transliteration, the user need not affirmatively select such Traditional Chinese characters in order to provide Chinese input on the mobile electronic device 4. Rather, the user can input Traditional Chinese characters onto the mobile electronic device 4 merely by inputting BoPoMoFo characters, such as with the use of the keyboard 24, which will automatically be transliterated into Traditional Chinese characters.

While the transliteration routine 44 provides transliterations of BoPoMoFo inputs and replaces BoPoMoFo inputs in the text input component 46 with transliterated Traditional Chinese characters, it is noted that these two operations are not necessarily performed contemporaneously. That is, in certain circumstances BoPoMoFo input is transliterated into Traditional Chinese characters that are output as the Traditional Chinese characters 60 in the lookup component 48. Such a transliteration does not, however, necessarily automatically result in the BoPoMoFo characters 56 in the text input component 46 actually being replaced with a Traditional Chinese character as a conversion thereof into Traditional Chinese characters.

More particularly, it is reiterated that some of the key 28 have a plurality of BoPoMoFo characters 26 assigned thereto. The user can multitap between the two BoPoMoFo characters 26 on such keys, with an initial actuation resulting in an input of the uppermost or leftmost BoPoMoFo character 26 on the key 28, and with a reactuation of the same key within a predetermined period of time resulting in a the alternate BoPoMoFo character 26 on the key 28 (sometimes referred to herein as a FLIP operation). The predetermined period of time can be, for example, one-half a second, although other predetermined periods of time can be appropriately employed. Additional actuations of such a key 28 within the predetermined period of time of the immediately preceding actuation enable the user to toggle between the two BoPoMoFo characters 26 assigned to the key 28.

It can be seen, therefore, that a single actuation of one of the keys 28 having a plurality of BoPoMoFo characters 26 assigned thereto can be said to be uncertain or ambiguous within the predetermined period of time since the user could reactuate the key 28 to input an alternate BoPoMoFo character 26 assigned to the same key 28. As a general matter, therefore, an input of a BoPoMoFo character 26 from one of the keys 28 having a plurality of BoPoMoFo characters 26 assigned thereto will generally not be processed by the transliteration routine 44, or will at least not result in an updating of the Traditional Chinese characters 60 in the lookup component 48 to reflect the additional BoPoMoFo input, until the additional BoPoMoFo input is finalized in some fashion.

Two exemplary finalization events that result in the finalization of a BoPoMoFo input are described herein, but it is understood that other finalization events that are not expressly depicted herein can be employed without departing from the present concept. One exemplary finalization event is an expiration of the predetermined period of time from the most recent BoPoMoFo input without a detection of another BoPoMoFo input. For example, a given BoPoMoFo input can be considered to be a current BoPoMoFo input which, if unchanged by a reactuation of the same key 28 within the predetermined period of time, will become finalized upon an expiration of the predetermined period of time from its input. Another exemplary finalization event would be a detected input of a BoPoMoFo character 26 from an actuation of a different key. For example, an actuation of one key 28 having a plurality of BoPoMoFo characters 26 assigned thereto will result in one of the BoPoMoFo characters 26 assigned to that one key 28 being a current input, and a detection of a BoPoMoFo input due to an actuation of a different key 28 will finalize the aforementioned current input. For the sake of completeness, it is noted that such an inputting of a BoPoMoFo character 26 from a different key 28 would, in order to be a finalization event, need to be detected within the predetermined period of time of the immediately preceding BoPoMoFo input, otherwise the immediately preceding BoPoMoFo input would have been already finalized by the detection of the expiration of the predetermined period of time as a finalization event of the current BoPoMoFo input.

Upon a detection of a finalization event, such as the two aforementioned exemplary finalization events, the current BoPoMoFo input and any preceding BoPoMoFo inputs that have not yet been converted into a Traditional Chinese character, such as a Traditional Chinese character 52 in the text input component 46, will be input into the transliteration routine 44 and will be transliterated. That is, in the present exemplary embodiment the string of BoPoMoFo inputs 56 will be the subject of a search of the character table 42 and will, if valid, result in the returning from the dictionary 42 of a number of matching Traditional Chinese characters 60 that are output in the lookup component 48. Such Traditional Chinese characters 60 are each a transliteration of the string of BoPoMoFo characters that was submitted to the transliteration routine 44. Advantageously, therefore, the refraining from changing the Traditional Chinese characters 60 in the lookup component 48 until a BoPoMoFo input has been finalized avoids distracting the user with an outputting of Traditional Chinese characters that are based upon ambiguous, i.e., unfinalized BoPoMoFo inputs and may not be anything like what the user intended. The avoidance of such a distraction facilitates input by enabling a user to concentrate on the inputting effort without being distracted by outputs that are not useful.

As mentioned above, the outputting of proposed transliterations in the lookup component 48 of input that is depicted in the text input component 46 does not necessarily result in a conversion of the BoPoMoFo input, in the present example, into a specific Traditional Chinese character, such as one that might be among a plurality of proposed transliterations of the BoPoMoFo input in the lookup component 48. Such a conversion of a number of BoPoMoFo characters 56 in the text input component 46 into a Traditional Chinese character 60 from the lookup component 48 would result in the Traditional Chinese character being output in the text input component 46 in place of the BoPoMoFo characters 56 and as a conversion thereof into a Traditional Chinese character.

Any of a number of events can be detected as conversion events which will trigger a conversion of at least a portion of the BoPoMoFo content of the text input component 46 into a Traditional Chinese character. For example, if a finalized BoPoMoFo input would be invalid in combination with one or two preceding unconverted BoPoMoFo inputs that alone are valid, and no additional BoPoMoFo input could make the combination valid, the preceding BoPoMoFo inputs will be converted into a Traditional Chinese character by the transliteration routine 44. That is, one of the Traditional Chinese characters 60 that had been identified as a valid transliteration of the preceding BoPoMoFo characters 56 will be output in the text input component 46 in place of the preceding BoPoMoFo characters 56. If the preceding BoPoMoFo characters 56 can be transliterated into a plurality of Traditional Chinese characters, the particular one of the plurality of Traditional Chinese characters that will be output in the text input component 46 as the conversion can be selected by the transliteration routine 44 according to any of a variety of criteria. In the exemplary system described herein, the Traditional Chinese character having a relatively highest frequency of usage will be output in the text input component 46 in place of the preceding BoPoMoFo characters 56 as a transliteration and a conversion thereof. Other selection criteria may be employed, however, without departing from the present concept.

Another such conversion event can be detected when three most recent BoPoMoFo characters can be transliterated into one or more Traditional Chinese characters, and the user has input an additional BoPoMoFo character, i.e., a fourth BoPoMoFo character. In such a situation, the three BoPoMoFo characters 56 in the text input component 46 will be replaced with a Traditional Chinese character as a transliteration thereof. Prior to the inputting of the fourth BoPoMoFo character, the proposed transliterations of the three BoPoMoFo characters may be output in the lookup component 48, but conversion of the three BoPoMoFo characters 56 to one of the Traditional Chinese characters 60 in the lookup component 48 is delayed in order to enable the user to affirmatively select one of the Traditional Chinese characters 60 in the lookup component 48, if desired. The inputting of the fourth BoPoMoFo character without such an affirmative selection of a Traditional Chinese character 60 in the lookup component 48 will be detected by the transliteration routine 44 as an implicit selection of, in the present example, the most frequently used Traditional Chinese character 60, although other selection criteria can be employed without departing from the present concept.

Figure 3:
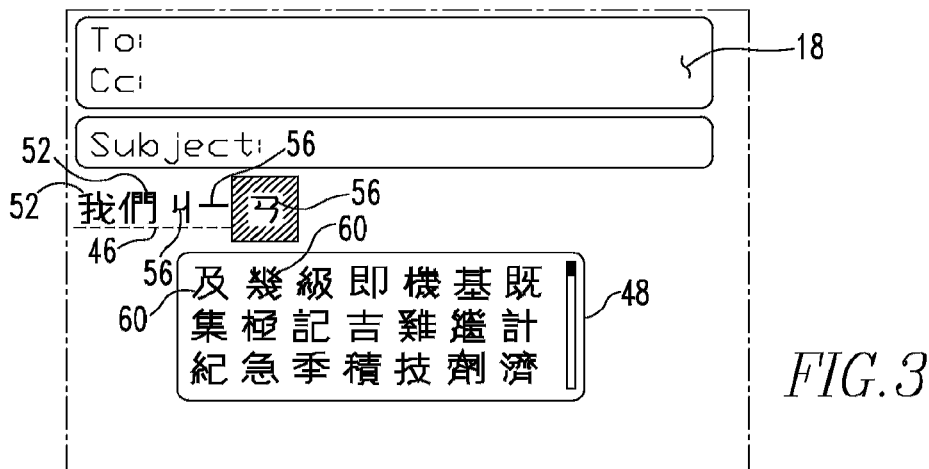
FIG. 3 is an exemplary output that can be provided on a display of the mobile electronic device of FIG. 1.

By way of example, FIG. 1 depicts the two BoPoMoFo characters 56 in the text input component 46 as having been finalized and with the lookup component 48 displaying a plurality of Traditional Chinese characters 60 that each constitutes a valid transliteration of the two BoPoMoFo characters 56. FIG. 3 depicts the detection of a third BoPoMoFo input prior to its finalization. For instance, the text input component 46 of FIG. 3 is depicted as including three BoPoMoFo characters 56, but the lookup component 48 is unchanged from that of FIG. 1. That is, the third BoPoMoFo character 56 is displayed in the text input component 46, but since it is unfinalized the lookup component 48 remains unchanged. As mentioned above, this occurs in the exemplary embodiment depicted herein by not subjecting an unfinalized string of BoPoMoFo inputs to the transliteration routine 44, although in other embodiments this could be accomplished despite processing with the transliteration routine 44 by simply not outputting in the lookup component 48 an updated set of Traditional Chinese characters 60 directed toward the unfinalized BoPoMoFo input.

Figure 4:
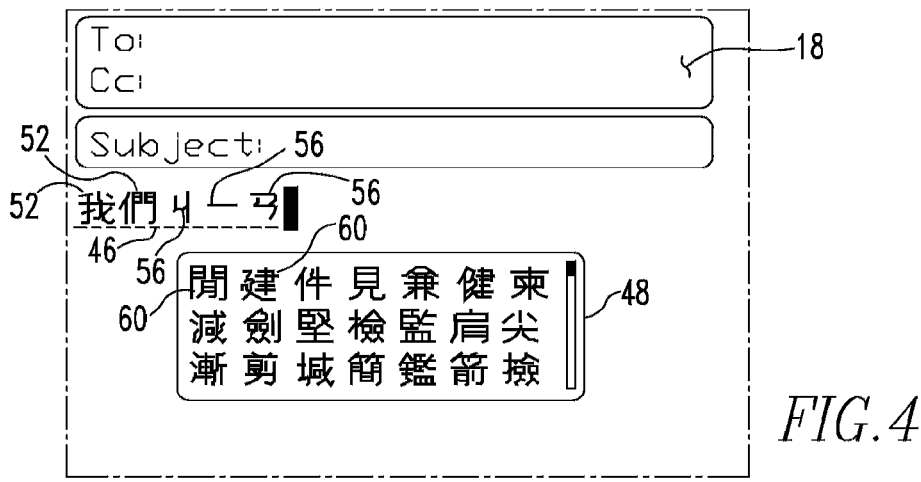
FIG. 4 is another exemplary output.

FIG. 4 is similar to FIG. 3, except for depicting the result of a finalization of the third BoPoMoFo character 56 due to expiration of the predetermined period of time without detecting another BoPoMoFo input. As can be seen from FIG. 4, the Traditional Chinese characters 60 in the lookup component 48 are different than those in FIGS. 1 and 3, which reflects the processing of all three of the BoPoMoFo characters 56 in the text input component 46 with the transliteration routine 44.

Figure 5:
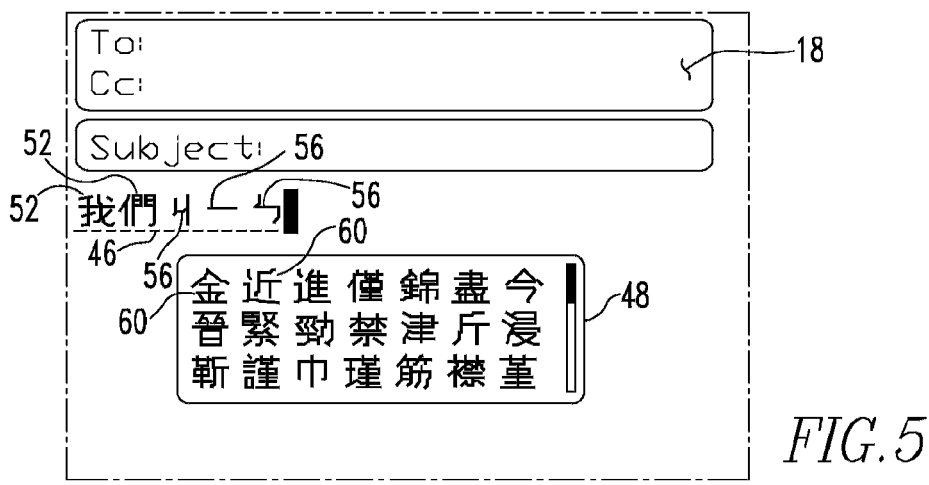
FIG. 5 is another exemplary output.

FIG. 5 is similar to FIG. 3, except for depicting a reactuation of the key 28 that resulted in the inputting of the third BoPoMoFo character 56 in FIG. 3. That is, the third BoPoMoFo character 56 in FIG. 3 is the subject of a FLIP operation since the key 28 which caused the inputting of the third BoPoMoFo character 52 in FIG. 3 has been reactuated within the predetermined period of time to replace the third BoPoMoFo character 52 in FIG. 3 with another third BoPoMoFo character 52 in the text input component 46 of FIG. 5. It is noted that the third BoPoMoFo character 56 is depicted in the text input component 46 of FIG. 5 as having been finalized as a result of an expiration of the predetermined period of time after the reactuation of the key 28 that resulted in the input. It thus can be seen that the three BoPoMoFo characters 56 in FIG. 5 have been subjected to the transliteration routine 44, and the Traditional Chinese characters 60 of the lookup component 48 are each proposed transliterations of the three BoPoMoFo characters 56 of FIG. 5, and thus are different than the Traditional Chinese characters 60 in the lookup component 48 of FIG. 3.

It is reiterated that FIG. 4 depicts the third BoPoMoFo character 56 as having been finalized, with the Traditional Chinese characters 60 in the lookup component 48 of FIG. 4 each being a valid transliteration of the three BoPoMoFo characters 56. However, the three BoPoMoFo characters in FIG. 4 have not yet been converted to a Traditional Chinese character, i.e., the three BoPoMoFo characters 56 remain in the text input component 46 of FIG. 4 without having been replaced with a transliteration thereof in the form of a Traditional Chinese character 60 from the lookup component 48. As suggested above, this gives the user an opportunity to select a particular transliteration, i.e., a particular Traditional Chinese character 60, from the lookup component 48. If such a Traditional Chinese character 60 is affirmatively selected by the user, the three BoPoMoFo characters 56 will be converted to the selected Traditional Chinese character 60 and will be replaced in the text input component 46 with the selected Traditional Chinese character 60.

Figure 6:
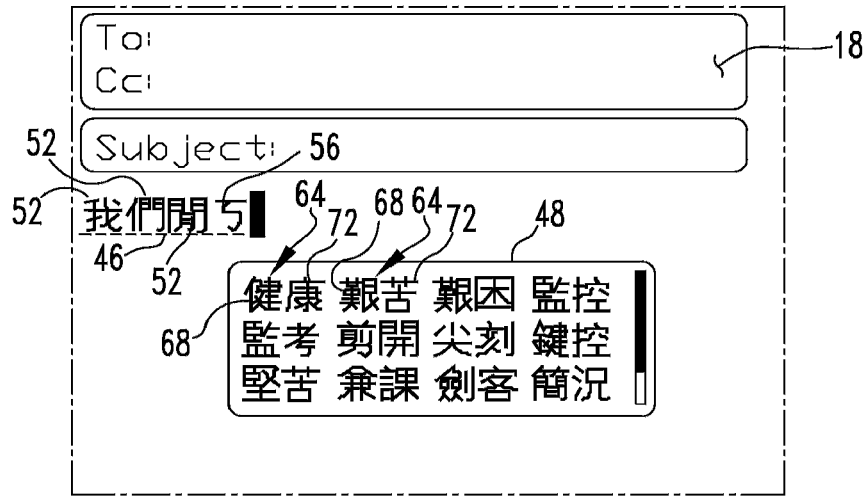
FIG. 6 is another exemplary output.

If however, instead of affirmatively selecting one of the Traditional Chinese characters 60 in the lookup component 48 of FIG. 4, the user instead continues to input BoPoMoFo characters, such as is indicated generally in FIG. 6, the additional input of a BoPoMoFo character will be detected as a conversion event which will cause the three BoPoMoFo characters 56 of FIG. 4 to be automatically replaced in the text input component 46 with one of the Traditional Chinese characters 60 in the lookup component 48 of FIG. 4. Such a situation is likewise reflected in FIG. 6 wherein the text input component 46 is now depicted as including three Traditional Chinese characters 52 and only a single BoPoMoFo character 56. In the exemplary embodiment depicted in FIG. 6, the lookup component 48 includes a number of variants 64 which, in the depicted example, are each in the form of a variant 64 Chinese predicted word that comprises two Traditional Chinese characters. Each such variant 64 depicts, for example, a first Traditional Chinese character 68 and a second Traditional Chinese character 72, with the first Traditional Chinese character 68 being an alternative transliteration of the previously converted character 52. The second character 72 is both a predicted transliteration of the single BoPoMoFo character 56 as well as a predicted additional Traditional Chinese character to form the two-character predicted Chinese word.

Figure 7:
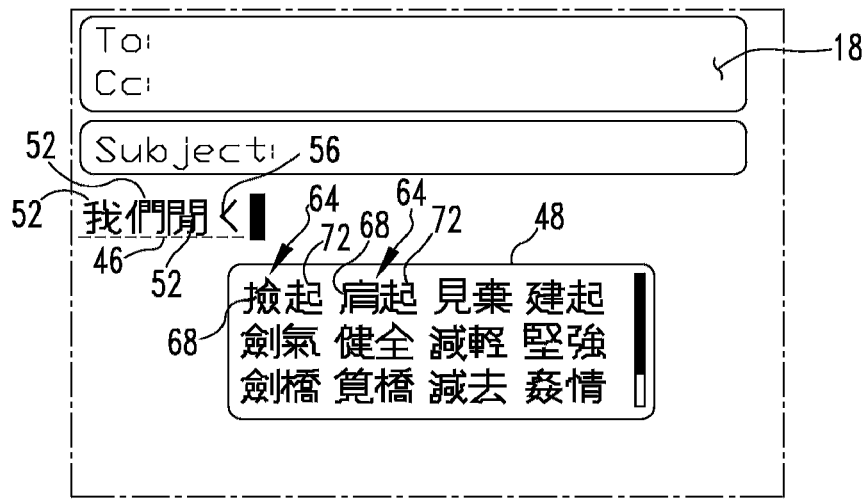
FIG. 7 is another exemplary output.

It is noted that FIG. 6 depicts the single BoPoMoFo character 56 as having been finalized due to an expiration of the predetermined period of time without detecting another BoPoMoFo input, thus resulting in the updated lookup component 48. FIG. 7 is similar to FIG. 6 except depicting the single BoPoMoFo character 56 in the text input component 46 as having resulted from a double actuation of one of the keys 28. That is, FIG. 7 depicts one of the keys 28 as having been actuated and then reactuated within the predetermined period of time to result in the BoPoMoFo character 56 of FIG. 7 being a flipped character. FIG. 7 similarly depicts its single BoPoMoFo character 56 as having been finalized due to an expiration of the predetermined period of time without an additional BoPoMoFo input. It can also be seen that the single BoPoMoFo input 56 of FIG. 7 has been processed with the transliteration routine 44, thereby resulting in the lookup component 48, which is different than the lookup component 48 of FIG. 6 which resulted from processing of the different single BoPoMoFo character 56 with the transliteration routine 44.

Figure 8:
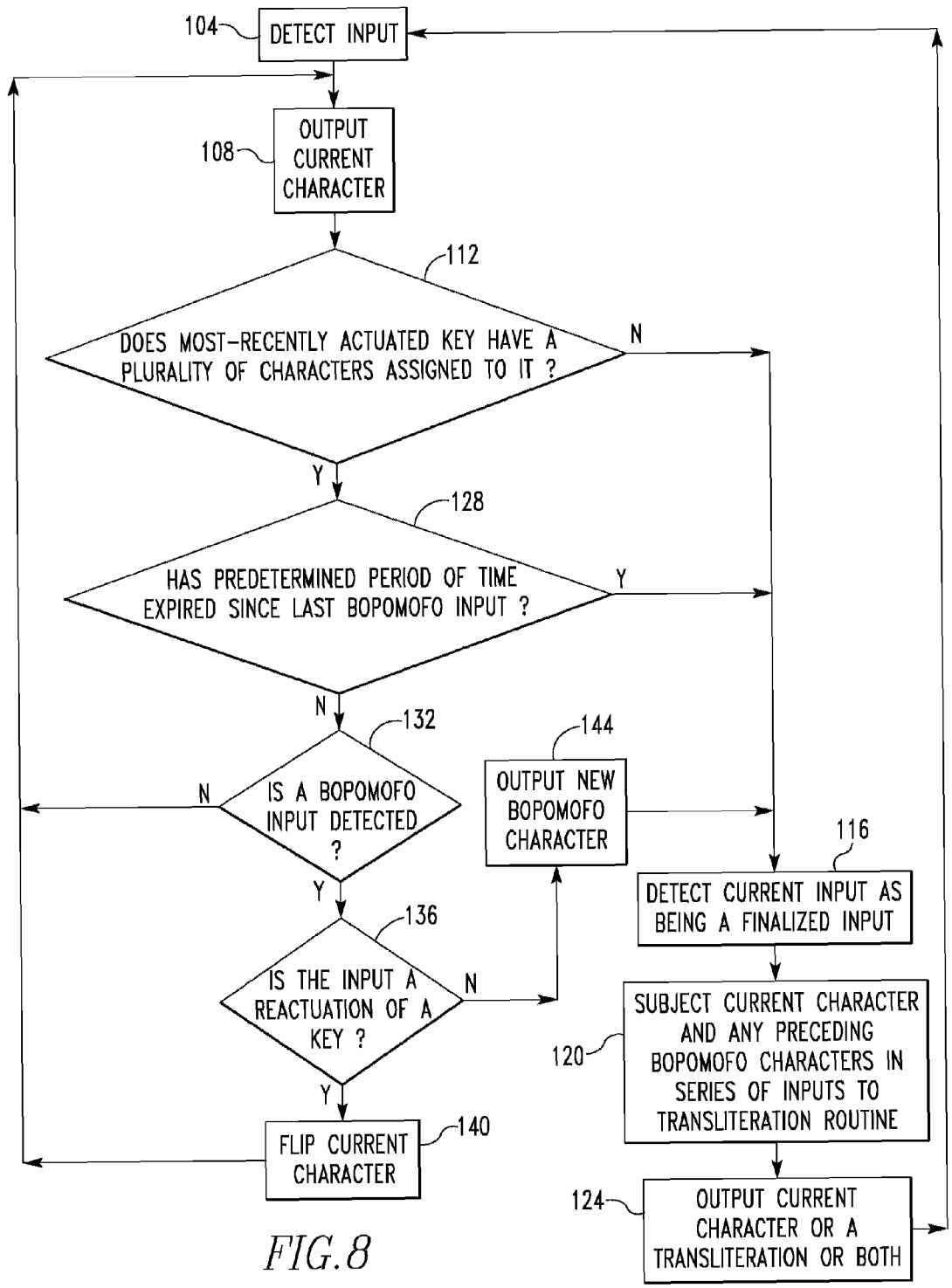
FIG. 8 is an exemplary flowchart depicting at least a portion of an improved method in accordance with the disclosed and claimed concept and which can be executed on the mobile electronic device of FIG. 1.

FIG. 8 depicts a flowchart illustrating some of the aspects of the finalization process which causes BoPoMoFo inputs to be processed by the transliteration routine 44. Processing begins with a detection of an input of a BoPoMoFo character, as at 104. The detected BoPoMoFo character is considered to be a current character and is output, as at 108. It is determined, as at 112, whether the current input resulted from an actuation of a key 28 that has a plurality of BoPoMoFo characters 26 assigned thereto. If the key 28 is determined at 112 to not have a plurality of the BoPoMoFo characters 26 assigned thereto, processing continues, as at 116, where the current character is detected as being a finalized input, and processing thereafter continues, as at 120, where the current character, i.e., a BoPoMoFo character, and any preceding unconverted BoPoMoFo characters in the series of inputs are subjected to the transliteration routine 44. Processing thereafter continues, as at 124, where the current BoPoMoFo character is output, such as in the text input component 46, or a transliteration of at least the current BoPoMoFo is output, such as in the lookup component 48, or both. Processing thereafter continues, as at 104, where additional BoPoMoFo input can be detected. This aforementioned loop of the flowchart in FIG. 8 depicts the situation wherein a BoPoMoFo input is unambiguous, and it is therefore unnecessary to await an occurrence of a finalization event.

On the other hand, if it is determined, as at 112, that the key 28 that was most recently actuated to provide the current character has a plurality of BoPoMoFo characters 26 assigned thereto, processing continues, as at 128, where it is determined whether or not the predetermined period of time has expired since the most recent BoPoMoFo input, i.e., whether or not it has expired without a detection of another BoPoMoFo input. If the predetermined period of time has expired, processing continues, as at 116 where the current character is detected as being finalized, and processing continues therefrom as set forth above.

On the other hand, if it is determined at 128 that the predetermined period of time has not expired, processing continues as at 132 where it is determined whether another BoPoMoFo input has been detected, it being reiterated that the processing at 132 occurs prior to the expiration of the predetermined period of time. If no input is detected at 132, processing loops back to 108 where the current character is continued to be output.

However, if at 132 another BoPoMoFo input is detected, i.e., it is detected within the predetermined period of time, processing continues to 136 where it is determined whether the most recent input is a reactuation of a key 28. If yes, processing continues at 140 where the current character is subjected to a FLIP operation wherein the current character is changed to be another character of the reactuated key. Processing continues, as at 108, where the current character, i.e., the flipped character, is output. However, if it is determined at 136 that the most recent BoPoMoFo input is not a reactuation of a key 28, i.e., it is an actuation of different key, a new BoPoMoFo character is output in the text input component 46, as at 144, and the current character, i.e., the BoPoMoFo character immediately preceding the new character, is detected at 116 as being a finalized input. Processing thereafter continues as set forth above.

It thus can be seen that the processing of newly input BoPoMoFo characters that are subject to possible change within the predetermined period of time is delayed until detection of a finalization event. Accordingly, the user is relieved of the distraction of having proposed transliterations of an unfinalized BoPoMoFo input being output on the display 18. This facilitates input into the mobile electronic device 4.

Figure 9:
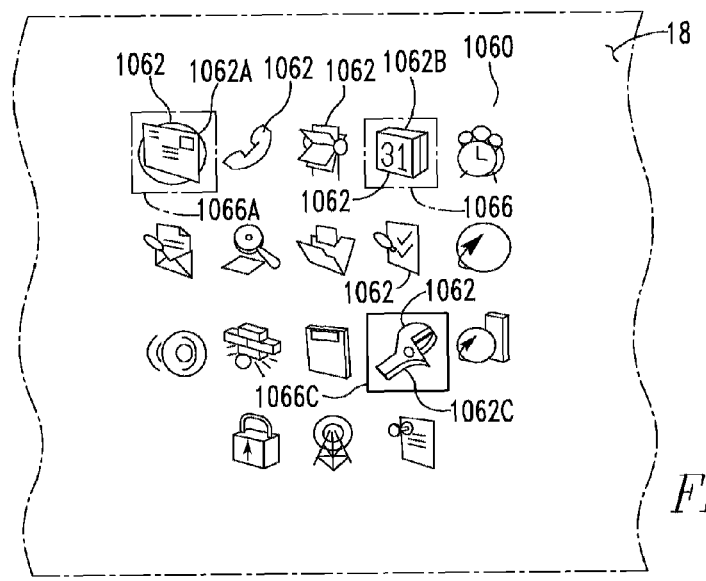
FIG. 9 is an exemplary home screen that can be visually output on the mobile electronic device.

Additional benefits are provided by the multiple-axis input device. For instance, an exemplary home screen output that can be visually output on the display 18 is depicted in FIG. 9 as including a plurality of icons 1062 that are selectable by the user for the purpose of, for example, initiating the execution on the processor apparatus 16 of a routine 44 that is represented by an icon 1062. The trackball 32 is rotatable to provide, for example, navigational inputs among the icons 1062.

For example, FIG. 9 depicts the travel of an indicator 1066 from the icon 1062A, as is indicated in broken lines with the indicator 1066A, to the icon 1062B, as is indicated in broken lines with the indicator 1066B, and onward to the icon 1062C, as is indicated by the indicator 1066C. It is understood that the indicators 1066A, 1066B, and 1066C are not necessarily intended to be simultaneously depicted on the display 18, but rather are intended to together depict a series of situations and to indicate movement of the indicator 1066 among the icons 1062. The particular location of the indicator 1066 at any given time indicates to a user the particular icon 1062, for example, that is the subject of a selection focus of the mobile electronic device 4. Whenever an icon 1062 or other selectable object is the subject of the selection focus, a selection input to the processor apparatus 16 will result in execution or initiation of the routine 44 or other function that is represented by the icon 1062 or other selectable object.

The movement of the indicator 1066 from the icon 1062A, as indicated with the indicator 1066A, to the icon 1062B, as is indicated by the indicator 1066B, was accomplished by rotating the trackball 32 about the vertical axis 34B to provide a horizontal navigational input. As mentioned above, a rotation of the trackball 32 a predetermined rotational distance results in an input to the processor apparatus 16. In the present example, the trackball 32 would have been rotated about the vertical axis 34B a rotational distance equal to three times the predetermined rotational distance since the icon 62B is disposed three icons 1062 to the right the icon 1062A. Such rotation of the trackball 32 likely would have been made in a single motion by the user, but this need not necessarily be the case.

Similarly, the movement of the indicator 1066 from the icon 1062B, as indicated by the indicator 1066B, to the icon 1062C, as is indicated by the indicator 1066C, was accomplished by the user rotating the trackball 32 about the horizontal axis 34A to provide a vertical navigational input. In so doing, the trackball 32 would have been rotated a rotational distance equal to two times the predetermined rotational distance since the icon 1062C is disposed two icons 1062 below the icon 1062B. Such rotation of the trackball 32 likely would have been made in a single motion by the user, but this need not necessarily be the case.

It thus can be seen that the trackball 32 is rotatable in various directions to provide various navigational and other inputs to the processor apparatus 16. Rotational inputs by the trackball 32 typically are interpreted by whichever routine 44 is active on the mobile electronic device 4 as inputs that can be employed by such routine 44. For example, the GUI 44 that is active on the mobile electronic device 4 in FIG. 9 requires vertical and horizontal navigational inputs to move the indicator 1066, and thus the selection focus, among the icons 1062. If a user rotated the trackball 32 about an axis oblique to the horizontal axis 34A and the vertical axis 34B, the GUI 44 likely would resolve such an oblique rotation of the trackball 32 into vertical and horizontal components which could then be interpreted by the GUI 44 as vertical and horizontal navigational movements, respectively. In such a situation, if one of the resolved vertical and horizontal navigational movements is of a greater magnitude than the other, the resolved navigational movement having the greater magnitude would be employed by the GUI 44 as a navigational input in that direction to move the indicator 1066 and the selection focus, and the other resolved navigational movement would be ignored by the GUI 44, for example.

When the indicator 1066 is disposed on the icon 1062C, as is indicated by the indicator 1066C, the selection focus of the mobile electronic device 4 is on the icon 1062C. As such, a translation of the trackball 32 toward the housing 6 as described above would provide an input to the processor apparatus 16 that would be interpreted by the GUI 44 as a selection input with respect to the icon 1062C. In response to such a selection input, the processor apparatus 16 would, for example, begin to execute a routine 44 that is represented by the icon 1062C. It thus can be understood that the trackball 32 is rotatable to provide navigational and other inputs in multiple directions, assuming that the routine 44 that is currently active on the mobile electronic device 4 can employ such navigational or other inputs in a plurality of directions, and can also be translated to provide a selection input or other input.

Figure 11:
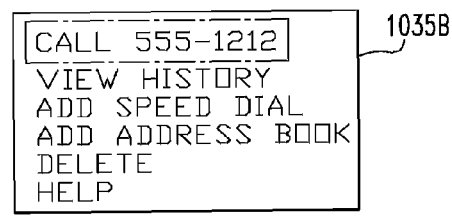
FIG. 11 depicts another exemplary menu.

As mentioned above, FIG. 10 depicts an exemplary menu 1035A that would be appropriate if the user's current logical location within the logical menu tree was viewing an email within an email routine 44. That is, the menu 1035A provides selectable options that would be appropriate for a user given that the user is, for example, viewing an email within an email routine 44. In a similar fashion, FIG. 11 depicts another exemplary menu 1035B that would be depicted if the user's current logical location within the logical menu tree was within a telephone routine 44.

Rotational movement inputs from the trackball 32 could be employed to navigate among, for example, the menus 1035A and 1035B. For instance, after an actuation of the <MENU> key 33 and an outputting by the GUI 44 of a resultant menu, the user could rotate the trackball 32 to provide scrolling inputs to successively highlight the various selectable options within the menu. Once the desired selectable option is highlighted, i.e., is the subject of the selection focus, the user could translate the trackball 32 toward the housing 6 to provide a selection input as to the highlighted selectable option. In this regard, it is noted that the <MENU> key 33 is advantageously disposed adjacent the trackball 32. This enables, for instance, the generation of a menu by an actuation the <MENU> key 33, conveniently followed by a rotation the trackball 32 to highlight a desired selectable option, for instance, followed by a translation of the trackball 32 toward the housing 6 to provide a selection input to initiate the operation represented by the highlighted selectable option.

It is further noted that one of the additional inputs that can be provided by a translation of the trackball 32 is an input that causes the GUI 44 to output a reduced menu. For instance, a translation of the trackball 32 toward the housing 6 could result in the generation and output of a more limited version of a menu than would have been generated if the <MENU> key 33 had instead been actuated. Such a reduced menu would therefore be appropriate to the user's current logical location within the logical menu tree and would provide those selectable options which the user would have a high likelihood of selecting. Rotational movements of the trackball 32 could provide scrolling inputs to scroll among the selectable options within the reduced menu 1035C, and translation movements of the trackball 32 could provide selection inputs to initiate whatever function is represented by the selectable option within the reduce menu 1035C that is currently highlighted.

Figure 12:
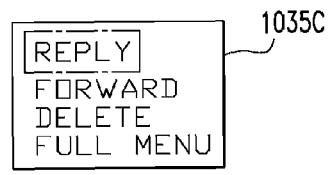
FIG. 12 depicts an exemplary reduced menu.

By way of example, if instead of actuating the <MENU> key 33 to generate the menu 1035A the user translated the trackball 32, the GUI 44 would generate and output on the display the reduced menu 1035C that is depicted generally in FIG. 12. The exemplary reduced menu 1035C provides as selectable options a number of the selectable options from the menu 1035A that the user would be most likely to select. As such, a user seeking to perform a relatively routine function could, instead of actuating the <MENU> key 33 to display the full menu 1035A, translate the trackball 32 to generate and output the reduced menu 1035C. The user could then conveniently rotate the trackball 32 to provide scrolling inputs to highlight a desired selectable option, and could then translate the trackball 32 to provide a selection input which would initiate the function represented by the selectable option in the reduced menu 1035C that is currently highlighted.

In the present exemplary embodiment, many of the menus that could be generated as a result of an actuation of the <MENU> key 33 could instead be generated and output in reduced form as a reduced menu in response to a translation of the trackball 32 toward the housing 6. It is noted, however, that a reduced menu might not be available for each full menu that could be generated from an actuation of the <MENU> key 33. Depending upon the user's specific logical location within the logical menu tree, a translation of the trackball 32 might be interpreted as a selection input rather than an input seeking a reduced menu. For instance, a translation of the trackball 32 on the home screen depicted in FIG. 1 would result in a selection input as to whichever of the icons 1062 is the subject of the input focus. If the <MENU> key 33 was actuated on the home screen, the GUI 44 would output a menu appropriate to the home screen, such as a full menu of all of the functions that are available on the mobile electronic device 4, including those that might not be represented by icons 1062 on the home screen.

Figure 13:
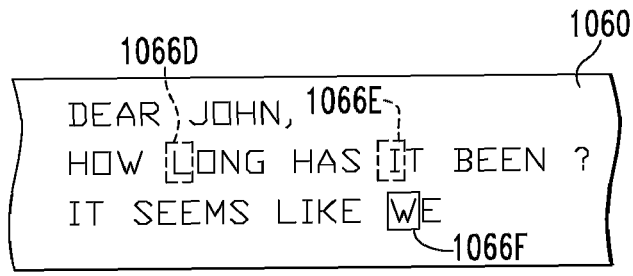
FIG. 13 is an output such as could occur during another exemplary text entry or text editing operation.

FIG. 13 depicts a quantity of text that is output on the display 18, such as during a text entry operation or during a text editing operation, for example. The indicator 1066 is depicted in FIG. 13 as being initially over the character "L", as is indicated with the indicator 1066D, and having been moved horizontally to the character "I", as is indicated by the indicator 1066E, and thereafter vertically moved to the character "W", as is indicated by the indicator 1066F. In a fashion similar to that in FIG. 9, the cursor 1066 was moved among the characters "L", "I", and "W" through the use of horizontal and vertical navigational inputs resulting from rotations of the trackball 32. In the example of FIG. 13, however, each rotation of the trackball 32 the predetermined rotational distance would move the indicator 1066 to the next adjacent character. As such, in moving the indicator 1066 between the characters "L" and "I," the user would have rotated the trackball 32 about the vertical axis 1034B a rotational distance equal to nine times the predetermined rotational distance, for example, since "I" is disposed nine characters to the right of "L".

Figure 14:
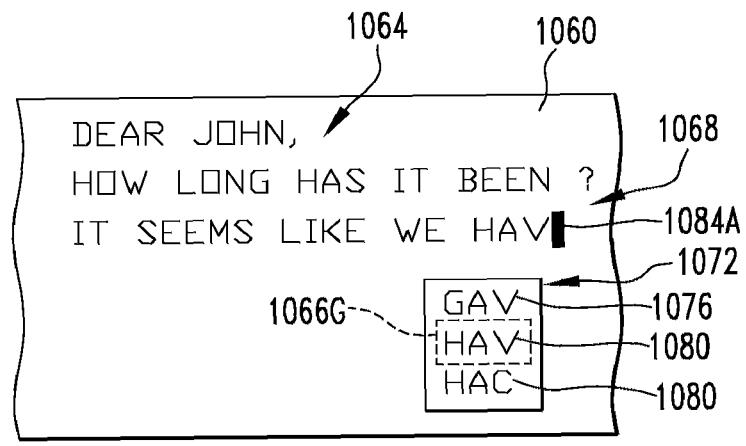
FIG. 14 is an output during another exemplary text entry operation.

FIG. 14 depicts an output 1064 on the display 18 during, for example, a text entry operation that employs the disambiguation routine 44. The output 1064 can be said to comprise a text component 1068 and a variant component 1072. The variant component 1072 comprises a default portion 1076 and a variant portion 1080. FIG. 14 depicts the indicator 1066G on the variant 1080 "HAV", such as would result from a rotation of the trackball 32 about the horizontal axis 34A to provide a downward vertical scrolling input. In this regard, it is understood that a rotation of the trackball 32 a distance equal to the predetermined rotational distance would have moved the indicator 1066 from a position (not expressly depicted herein) disposed on the default portion 1076 to the position disposed on the first variant 1080, as is depicted in FIG. 14. Since such a rotation of the trackball 32 resulted in the first variant 1080 "HAV" being highlighted with the indicator 1066G, the text component 1068 likewise includes the text "HAV" immediately preceding a cursor 1084A.

Figure 15:
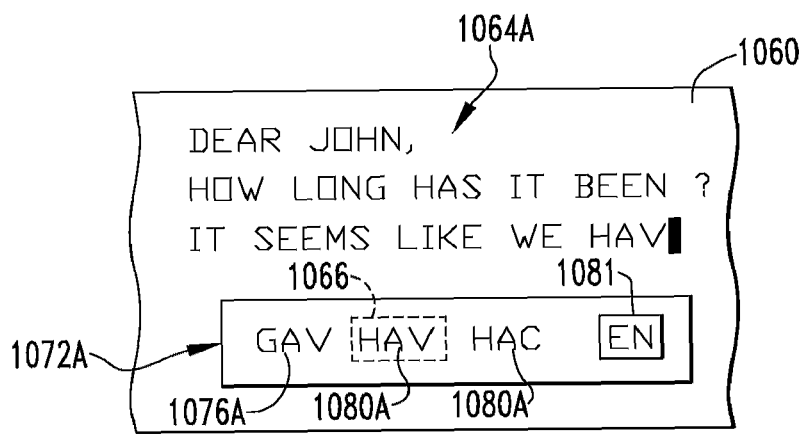
FIG. 15 is an alternative output during the exemplary text entry operation of FIG. 14.

FIG. 15 depict an alternative output 1064A having an alternative variant component 1072A having a default portion 1076A and a variant portion 1080A. The variant component 1072A is horizontally arranged, meaning that the default portion 1076A and the variants 1080A are disposed horizontally adjacent one another and can be sequentially selected by the user through the use of horizontal scrolling inputs, such as by the user rotating the trackball 32 the predetermined rotational distance about the vertical axis 34B. This is to be contrasted with the variant component 1072 of FIG. 14 wherein the default portion 1076 and the variants 1080 are vertically arranged, and which can be sequentially selected by the user through the user of vertical scrolling inputs with the trackball 32.

In this regard, it can be understood that the trackball 32 can provide both the vertical scrolling inputs employed in conjunction with the output 1064 as well as the horizontal scrolling inputs employed in conjunction with the output 1064A. For instance, the disambiguation routine 44 potentially could allow the user to customize the operation thereof by electing between the vertically arranged variant component 1072 and the horizontally arranged variant component 1072A. The trackball 32 can provide scrolling inputs in the vertical direction and/or the horizontal direction, as needed, and thus is operable to provide appropriate scrolling inputs regardless of whether the user chooses the variant component 1072 or the variant component 1072A. That is, the trackball 32 can be rotated about the horizontal axis 34A to provide the vertical scrolling inputs employed in conjunction with the variant component 1072, and also can be rotated about the vertical axis 34B to provide the horizontal scrolling inputs that are employed in conjunction with the variant component 1064A. The trackball 32 thus could provide appropriate navigational, strolling, selection, and other inputs depending upon the needs of the routine 44 active at any time on the mobile electronic device 4. The trackball 32 enables such navigational, strolling, selection, and other inputs to be intuitively generated by the user through rotations of the trackball 32 in directions appropriate to the active routine 44, such as might be indicated on the display 18.

It can further be seen from FIG. 15 that the variant component 1072A additionally includes a value 1081 that is indicative of the language into which the disambiguation routine 44 will interpret ambiguous text input. In the example depicted in FIG. 15, the language is English.

Figure 16:
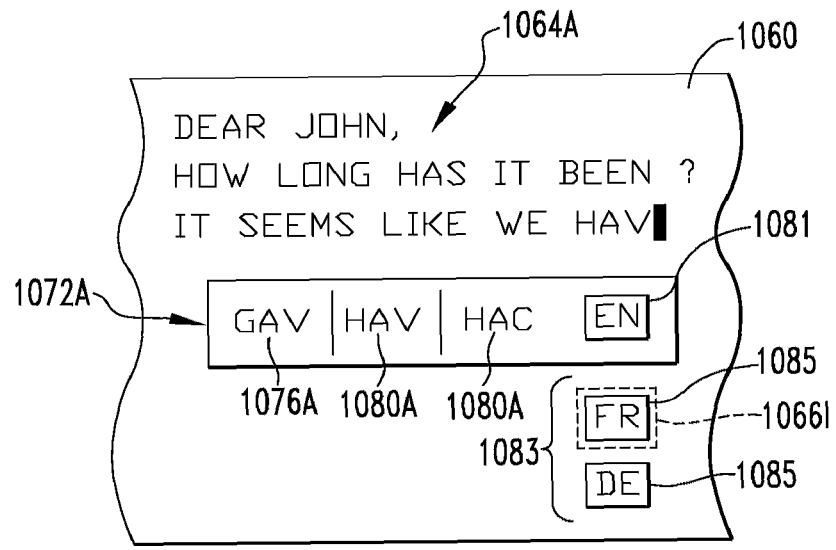
FIG. 16 is another output during another part of the exemplary text entry operation of FIG. 14.

As can be seen in FIG. 16, the value 1081 can be selected by the user to cause the displaying of a list 1083 of alternative values 1085. The alternative values 1085 are indicative of selectable alternative languages into which the disambiguation routine 44 can interpret ambiguous input. A selection of the value 1081 would have been achieved, for example, by the user providing horizontal scrolling inputs with the trackball 32 to cause (not expressly depicted herein) the indicator 1066 to be disposed over the value 1081, and by thereafter translating the trackball 32 toward the housing 6 to provide a selection input.

The alternative values 1085 in the list 1083 are vertically arranged with respect to one another and with respect to the value 1081. As such, a vertical scrolling input with the trackball 32 can result in a vertical movement of the indicator 10661 to a position on one of the alternative values 1085 which, in the present example, is the alternative value 1085 "FR", which is representative of the French language. The alternative value 1085 "FR" could become selected by the user in any of a variety of fashions, such as by actuating the trackball 32 again, by continuing to enter text, or in other fashions. It thus can be understood from FIG. 15 and FIG. 16 that the trackball 32 can be rotated to provide horizontal scrolling inputs and, when appropriate, to additionally provide vertical scrolling inputs and, when appropriate, to additionally provide selection inputs, for example.

Figure 17:
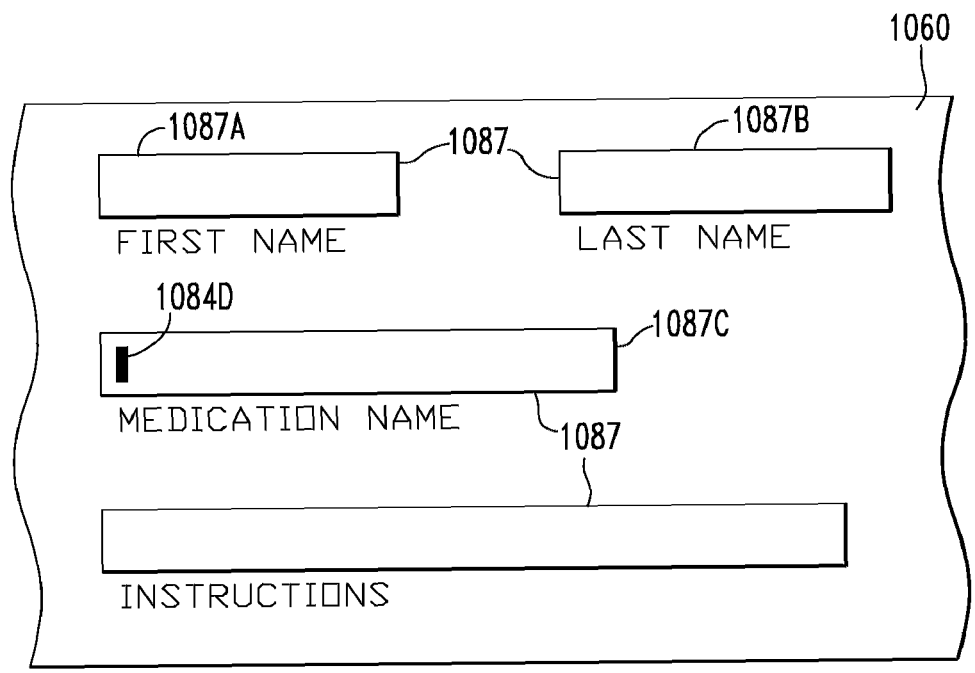
FIG. 17 is an exemplary output during a data entry operation.

FIG. 17 depicts another exemplary output on the display 18 such as might be employed by a data entry routine 44. The exemplary output of FIG. 17 comprises a plurality of input fields 1087 with corresponding descriptions. A cursor 1084D, when disposed within one of the input fields 1087, indicates to the user that an input focus of the mobile electronic device 4 is on that input field 1087. That is, data such as text, numbers, symbols, and the like, will be entered into whichever input field 1087 is active, i.e., is the subject of the input focus. It is understood that the mobile electronic device 4 might perform other operations or take other actions depending upon which input field 1087 is the subject of the input focus.

Navigational inputs from the trackball 32 advantageously enable the cursor 1084D, and thus the input focus, to be switched, i.e., shifted, among the various input fields 1087. For example, the input fields 1087 could include the input fields 1087A, 1087B, and 1087C. FIG. 17 depicts the cursor 1084D as being disposed in the input field 1087C, indicating that the input field 1087C is the subject of the input focus of the mobile electronic device 4. It is understood that the cursor 1084D, and thus the input focus, can be shifted from the input field 1087C to the input field 1087A, which is disposed adjacent and vertically above the input field 1087C, by providing a vertical scrolling input in the upward direction with the trackball 32. That is, the trackball 32 would be rotated the predetermined rotational distance about the horizontal axis 34. Similarly, the cursor 1084D, and thus the input focus, can be shifted from the input field 1087A to the input field 1087B, which is disposed adjacent and to the right of the input field 1087A, by providing a horizontal scrolling input to the right with the trackball 32. That is, such a horizontal scrolling input could be provided by rotating the trackball the predetermined rotational distance about the vertical axis 34B. It thus can be seen that the trackball 32 is rotatable in a plurality of directions about a plurality axes to provide navigational, scrolling, and other inputs in a plurality of directions among a plurality of input fields 1087. Other types of inputs and/or inputs in other applications will be apparent.

Figure 18:
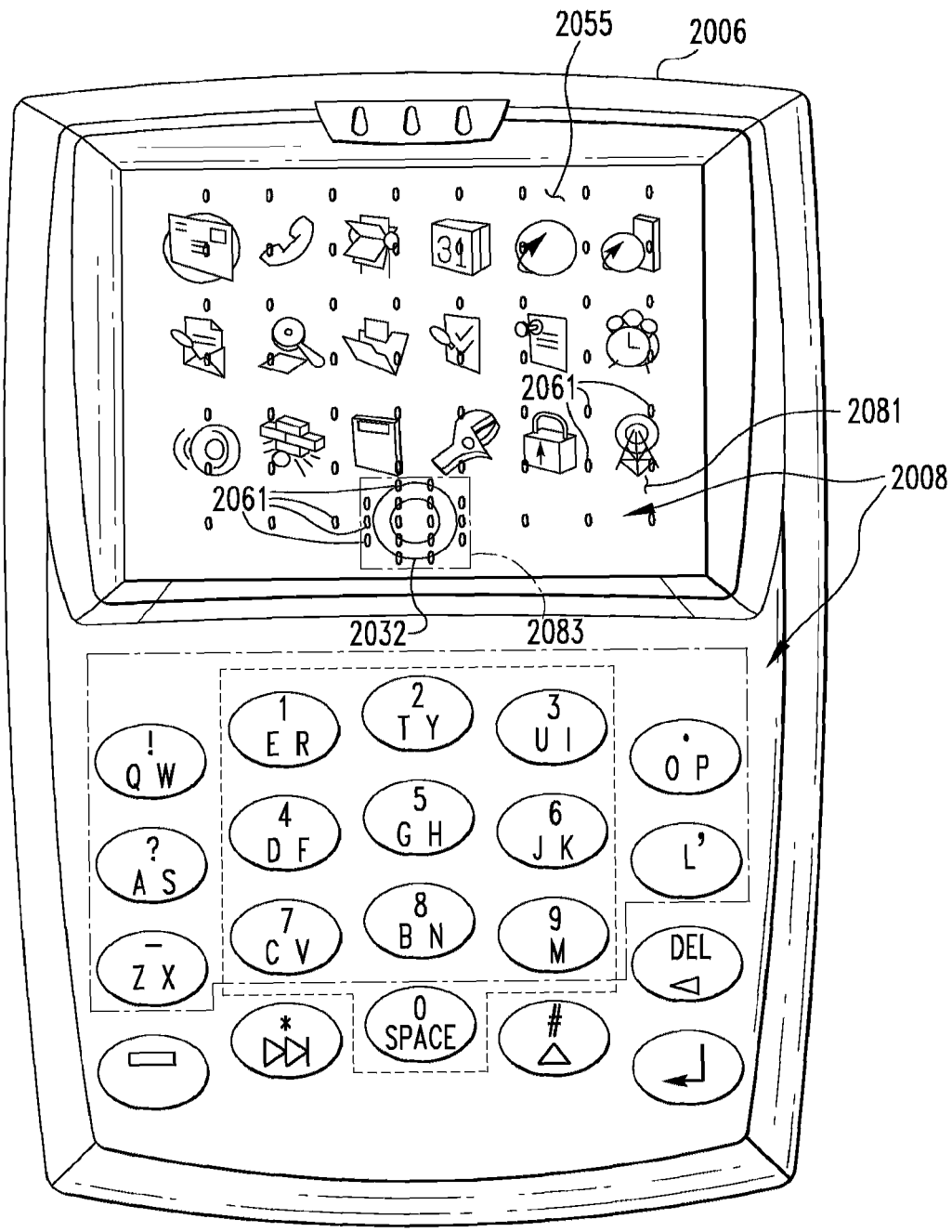
FIG. 18 is a top plan view of an improved mobile electronic device in accordance with another embodiment of the disclosed and claimed concept.
Figure 19:
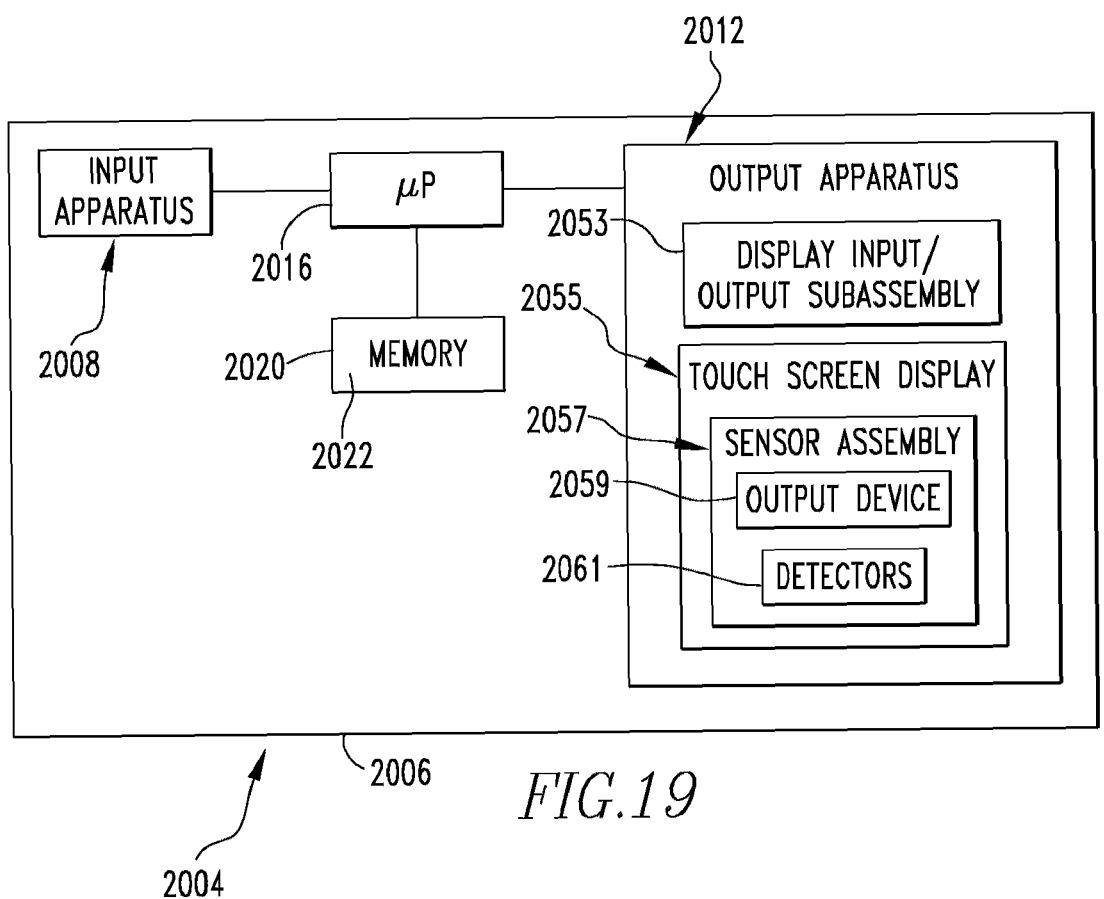
FIG. 19 is a schematic depiction of the improved mobile electronic device of FIG. 18.

An improved mobile electronic device 2004 in accordance with still another embodiment of the disclosed and claimed concept is depicted generally in FIG. 18 and FIG. 19. The mobile electronic device 2004 includes a housing 2006 upon which are disposed an input apparatus 2008, an output apparatus 2012, and a processor apparatus 2016. The processor apparatus 2016 comprises a processor 2036 a memory 2040 having stored therein a number of routines 2044. All of the operations that can be performed on or with the mobile electronic device 4 can be performed on or with the mobile electronic device 2004. As such, the features of the mobile electronic device 2004 that are common with the mobile electronic device 4, and this would comprise essentially all of the features of the mobile electronic device 4, will generally not be repeated.

As a general matter, the mobile electronic device 2004 is substantially identical in configuration and function to the mobile electronic device 4, except that the mobile electronic device 2004 includes a touch screen display 2055 that provides a non-mechanical multiple-axis input device 2032 instead of the trackball 32. The non-mechanical multiple-axis input device 2032 can be said to be in the form of a virtual trackball 2032.

As is generally understood, the touch screen display 2055 includes a liquid crystal layer between a pair of substrates, with each substrate including an electrode. The electrodes form a grid which defines the aperture size of the pixels. When a charge is applied to the electrodes, the liquid crystal molecules of the liquid crystal layer become aligned generally perpendicular to the two substrates. A display input/output subassembly 2053 of the output apparatus 2012 controls the location of the charge applied to the electrodes thereby enabling the formation of images on the touch screen display 2055.

Additionally, the touch screen display 2055 comprises a sensor assembly 2057 which comprises an output device 2059 and a plurality of detectors 2061. The detectors 2061 are shown schematically and are typically too small to be seen by the naked eye. Each detector 2061 is in electrical communication with the output device 2059 and creates an output signal when actuated. The detectors 2061 are disposed in a pattern, discussed below, and are structured to detect an external object immediately adjacent to, or touching, the touch screen display 2055. The external object is typically a stylus or a user's finger (not shown). The output device 2059 and/or the processor 2016 are structured to receive the detector signals and convert the signals to data representing the location of the external object relative to the touch screen display 2055. As such, while the sensor assembly 2057 is physically a component of the touch screen display 2055, it is nevertheless considered to be a logical component of the input apparatus 2008 since it provides input to the processor apparatus.

The detectors 2061 are typically capacitive detectors, optical detectors, resistive detectors, or mechanical detectors such as strain gauge or charged grid, although other technologies may be employed without departing from the present concept. Typically, capacitive detectors are structured to detect a change in capacitance caused by the electrical field of the external object or a change in capacitance caused by the compression of the capacitive detector. Optical detectors are structured to detect a reflection of light, e.g., light created by the touch screen display 2055. Mechanical detectors include a charged grid with columns that would be disposed on one side of the touch screen display 2055 and a corresponding grid without columns would be disposed at another location on the touch screen display 2055. In such a configuration, when the touch screen display 2055 is compressed, i.e. as a result of being touched by the user, the columns at the area of compression contact the opposing grid thereby completing a circuit.

Capacitive detectors may be disposed upon either substrate and, although small, require space. Thus, and any pixel that is disposed adjacent a detector 2061 will have a reduced size, or aperture, to accommodate the adjacent detector 2061.

The detectors 2061 are disposed in a pattern, and at least some of the detectors 2061 preferably are arranged in lines that form a grid. A first portion of the detectors 2061 are disposed on a first area 2081 of the touch screen display 2055, and a second portion of the detectors 2061 are disposed on a second area 2083 of the touch screen display 2055. As can be seen from FIG. 18, the first area 2081 essentially is every region of the touch screen display 2005 other than the second area 2083.

The first portion of the detectors 2061 disposed on the first area 2081 of the touch screen display 2055 are disposed in a relatively sparse pattern in order to minimize the visual interference that is caused by the presence of the detectors 2061 adjacent the pixels. Preferably, the spacing of the detectors 2061 on the first area 2081 is between about 1.0 mm and 10.0 mm between the detectors 2061, and more preferably about 3.0 mm between the detectors 2061.

The second portion of the detectors 2061 are disposed in a relatively dense pattern on the second area 2083 of the touch screen display 2055 and are structured to support the function of the virtual trackball 2032. The image quality in the second area 2083 of the touch screen display 2055 is adversely affected due to the dense spacing of the detectors 2061 there. However, the second area 2083 is a relatively small area compared to the entire touch screen display 2055. Preferably, the density of the detectors 2061 in the second area 2083 is between about 0.05 mm and 3.0 mm between the detectors, and more preferably about 0.1 mm between the detectors 2061. Further, because the pixels in the second area 2083 are dedicated for the virtual trackball 2032, it is acceptable to have a reduced pixel density with larger pixels. Since the pixel size would be very large, the aspect ratio would be significantly higher than that of pixels that are not disposed adjacent a detector 2061. The pixels in the second area 2083 likely would be special function pixels, such as pixels that would both depict the virtual trackball 2032 and that would light up the second area 2083 to highlight the virtual trackball 2032.

The processor apparatus is structured to create images and define the boundaries of selectable portions of the images on the touch screen display 2055. For example, the processor apparatus will create the images of selectable icons or other objects on specific portions of the touch screen display 2055. The processor apparatus is further structured to relate specific detectors 2061 to the specific portions of the touch screen display 2055. Thus, when the processor apparatus detects the actuation of a specific detector 2061 adjacent to a specific image, e.g. a selectable icon, the processor apparatus will initiate the function or routine related to that icon, e.g. opening a calendar program.

Similarly, the processor apparatus is structured to employ specific detectors 2061 to support the function of the virtual trackball 2032 in the second area 2083 of the touch screen display 2055. Thus, actuations of one or more of the detectors 2061 that support the virtual trackball 2032 will be interpreted by the processor apparatus as being inputs from the virtual trackball 2032. For instance, an actuation of a sequential plurality of detectors 2061 extending along a particular direction on the touch screen display 2055 in the second area 2083 might be interpreted as a navigational input, a scrolling input, a selection input, and/or another input in the particular direction. Since the user can freely move a finger, for instance, in any direction on the touch screen display 2055, the virtual trackball 2032 is a multiple-axis input device. Other inputs, such as a non-moving actuation of one or more detectors 2061 in the central region of the virtual trackball 2032 could be interpreted by the processor apparatus as an actuation input of the virtual trackball 2032, such as would be generated by an actuation of the trackball 32 of the mobile electronic device 1004 in a direction toward the housing 1006 thereof. It can be understood that other types of actuations of the detectors 2061 in the second area 2083 can be interpreted as various other inputs without departing from the disclosed and claimed concept.

The mobile electronic device 2004 thus comprises a multiple-axis input device 2032 that is non-mechanical but that still provides the same functional features and advantages as, say, the trackball 32 of the mobile electronic device 4. It is understood that the virtual trackball 2032 is but one example of the many types of multiple-axis input devices that could be employed on the mobile electronic device 2004.

While specific embodiments of the disclosed and claimed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed and claimed concept which is to be given the full breadth of the claims appended and any and all equivalents thereof.

What is claimed is:

1. A method comprising:
    detecting one or more character inputs in a first character alphabet as a preceding character string, the preceding character string corresponding to one or more valid characters in a second alphabet according to a transliteration operation;
    detecting a current character input in the first character alphabet following input of the preceding character string;
    determining whether the combination of the current character input with the preceding character string would result in an invalid transliteration result; and
    automatically performing, via a processor, an operation on the preceding character string to replace the preceding character string with a replacement character selected from among the one or more valid characters in the second alphabet if the combination would result in an invalid transliteration result.

2. The method of claim 1, further comprising:
    outputting the replacement character in place of the preceding character string.

3. The method of claim 1, further comprising:
    displaying the one or more valid characters as proposed transliterations in a lookup portion prior to detecting the current character input.

4. The method of claim 1, wherein the replacement character is selected from among the one or more valid characters according to a value representing frequency of usage of the one or more valid characters.

5. The method of claim 4, wherein the replacement character is a character having the highest frequency of usage from among the one or more valid characters.

6. The method of claim 1, wherein determining whether the combination of the current character input with the preceding character string would result in an invalid transliteration comprises determining whether there are characters in the second alphabet corresponding to the combination.

7. An electronic device comprising:
    a memory storing instructions; and
    a processor executing the instructions to:
        detect one or more character inputs in a first character alphabet as a preceding character string, the preceding character string corresponding to one or more valid characters in a second alphabet according to a transliteration operation;
        detect a current character input in the first character alphabet following input of the preceding character string;
        determine whether the combination of the current character input with the preceding character string would result in an invalid transliteration result; and
        automatically perform an operation on the preceding character string to replace the preceding character string with a replacement character selected from among the one or more valid characters in the second alphabet if the combination would result in an invalid transliteration result.

8. The electronic device of claim 7, the processor executing instructions to output the replacement character in place of the preceding character string.

9. The electronic device of claim 7, the processor executing instructions to display the one or more valid characters as proposed transliterations in a lookup portion prior to detecting the current character input.

10. The electronic device of claim 7, wherein the replacement character is selected from among the one or more valid characters according to a value representing frequency of usage of the one or more valid characters.

11. The electronic device of claim 10, wherein the replacement character is a character having the highest frequency of usage from among the one or more valid characters.

12. The electronic device of claim 7, wherein the instructions to determine whether the combination of the current character input with the preceding character string would result in an invalid transliteration comprise instructions to determine whether there are characters in the second alphabet corresponding to the combination.

13. A tangibly embodied non-transitory computer-readable storage medium storing instructions that, when executed by a processor of a device, cause the device to perform a method comprising:
   detecting one or more character inputs in a first character alphabet as a preceding character string, the preceding character string corresponding to one or more valid characters in a second alphabet according to a transliteration operation;
   detecting a current character input in the first character alphabet following input of the preceding character string;
   determining whether the combination of the current character input with the preceding character string would result in an invalid transliteration result; and
   automatically performing an operation on the preceding character string to replace the preceding character string with a replacement character selected from among the one or more valid characters in the second alphabet if the combination would result in an invalid transliteration result.

14. The computer-readable storage medium of claim 13, the method further comprising:
   outputting the replacement character in place of the preceding character string.

15. The computer-readable storage medium of claim 13, the method further comprising:
   displaying the one or more valid characters as proposed transliterations in a lookup portion prior to detecting the current character input.

16. The computer-readable storage medium of claim 13, wherein the replacement character is selected from among the one or more valid characters according to a value representing frequency of usage of the one or more valid characters.

17. The computer-readable storage medium of claim 16, wherein the replacement character is a character having the highest frequency of usage from among the one or more valid characters.

18. The computer-readable storage medium of claim 13, wherein determining whether the combination of the current character input with the preceding character string would result in an invalid transliteration comprises determining whether there are characters in the second alphabet corresponding to the combination.

* * * * *

UNITED STATES PATENT AND TRADEMARK OFFICE
CERTIFICATE OF CORRECTION

| | | |
|---|---|---|
| PATENT NO. | : 8,510,095 B2 | Page 1 of 1 |
| APPLICATION NO. | : 13/595659 | |
| DATED | : August 13, 2013 | |
| INVENTOR(S) | : Wang et al. | |

It is certified that error appears in the above-identified patent and that said Letters Patent is hereby corrected as shown below:

In the Specification

Col. 3, Line 58, "is" should read as --are--.

Col. 12, Line 48, "actuation the" should read as --actuation of the--.

Col. 13, Line 2, "reduce menu" should read as --reduced menu--.

Col. 14, Line 9, "depict" should read as --depicts--.

Col. 16, Line 56, "and any" should read as --any--.

Signed and Sealed this
Fifteenth Day of October, 2013

Teresa Stanek Rea
*Deputy Director of the United States Patent and Trademark Office*